(12) United States Patent
Gee

(10) Patent No.: US 7,665,220 B1
(45) Date of Patent: Feb. 23, 2010

(54) FLEXIBLE, SHEETLIKE FISH MEASURING DEVICE

(76) Inventor: Patrick Gee, 15778 Pistachio St., Chino Hills, CA (US) 91709

( * ) Notice: Subject to any disclaimer, the term of this patent is extended or adjusted under 35 U.S.C. 154(b) by 0 days.

(21) Appl. No.: 11/805,869

(22) Filed: May 23, 2007

(51) Int. Cl.
*G01B 5/02* (2006.01)
*A01K 77/00* (2006.01)

(52) U.S. Cl. .............................. 33/511; 33/485; 43/43.4
(58) Field of Classification Search ................... 33/511, 33/483–485, 494, 759–760
See application file for complete search history.

(56) References Cited

U.S. PATENT DOCUMENTS

| | | | |
|---|---|---|---|
| 4,631,851 A | 12/1986 | Whitehurst | |
| 4,876,818 A | 10/1989 | Fralick et al. | |
| 4,885,862 A | 12/1989 | Thayer | |
| 5,228,226 A | 7/1993 | Porosky | |
| D372,294 S | 7/1996 | Grimaldi, II | |
| 5,934,004 A | 8/1999 | Koe | |
| 6,094,996 A | 8/2000 | Campbell et al. | |
| 6,115,932 A | 9/2000 | Fedora | |
| 6,615,532 B2 | 9/2003 | Abel | |
| 2005/0278967 A1* | 12/2005 | Du Plessis | 33/493 |
| 2006/0005460 A1* | 1/2006 | Bittrick | 43/43.4 |
| 2008/0034600 A1* | 2/2008 | Rabe | 33/512 |

* cited by examiner

*Primary Examiner*—Yaritza Guadalupe-McCall

(57) ABSTRACT

The present invention is a towel or absorbent cloth adapted for use by a fisherman for grasping a freshly caught fish with measurement means visible on a surface of the towel or absorbent cloth. In a preferred embodiment, attaching means provide for attachment of the towel to a belt or pants top of a user so that it can be easily reached upon catching a fish. In another embodiment, a grasping part of the towel or cloth is adapted to minimize absorbency to preserve the protective slime coat of a freshly caught fish so that it can be safely released after measurement.

7 Claims, 3 Drawing Sheets

U.S. Patent  Feb. 23, 2010  Sheet 1 of 3  US 7,665,220 B1
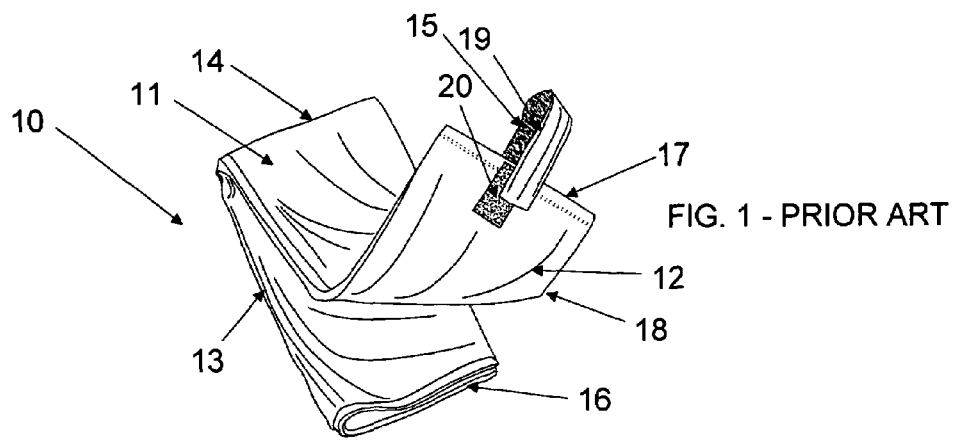
FIG. 1 - PRIOR ART
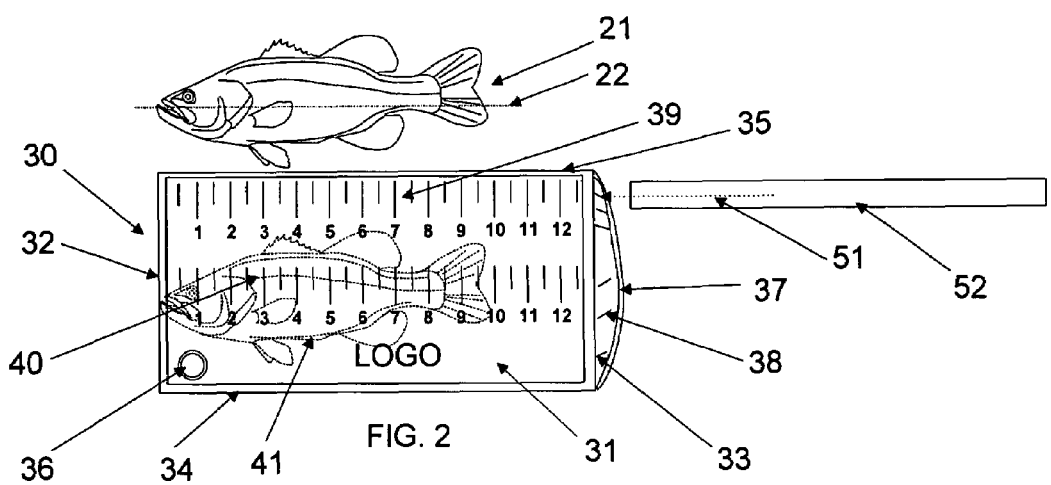
FIG. 2
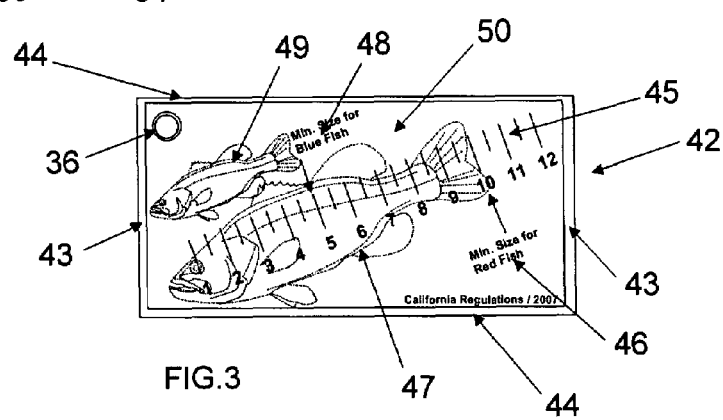
FIG. 3

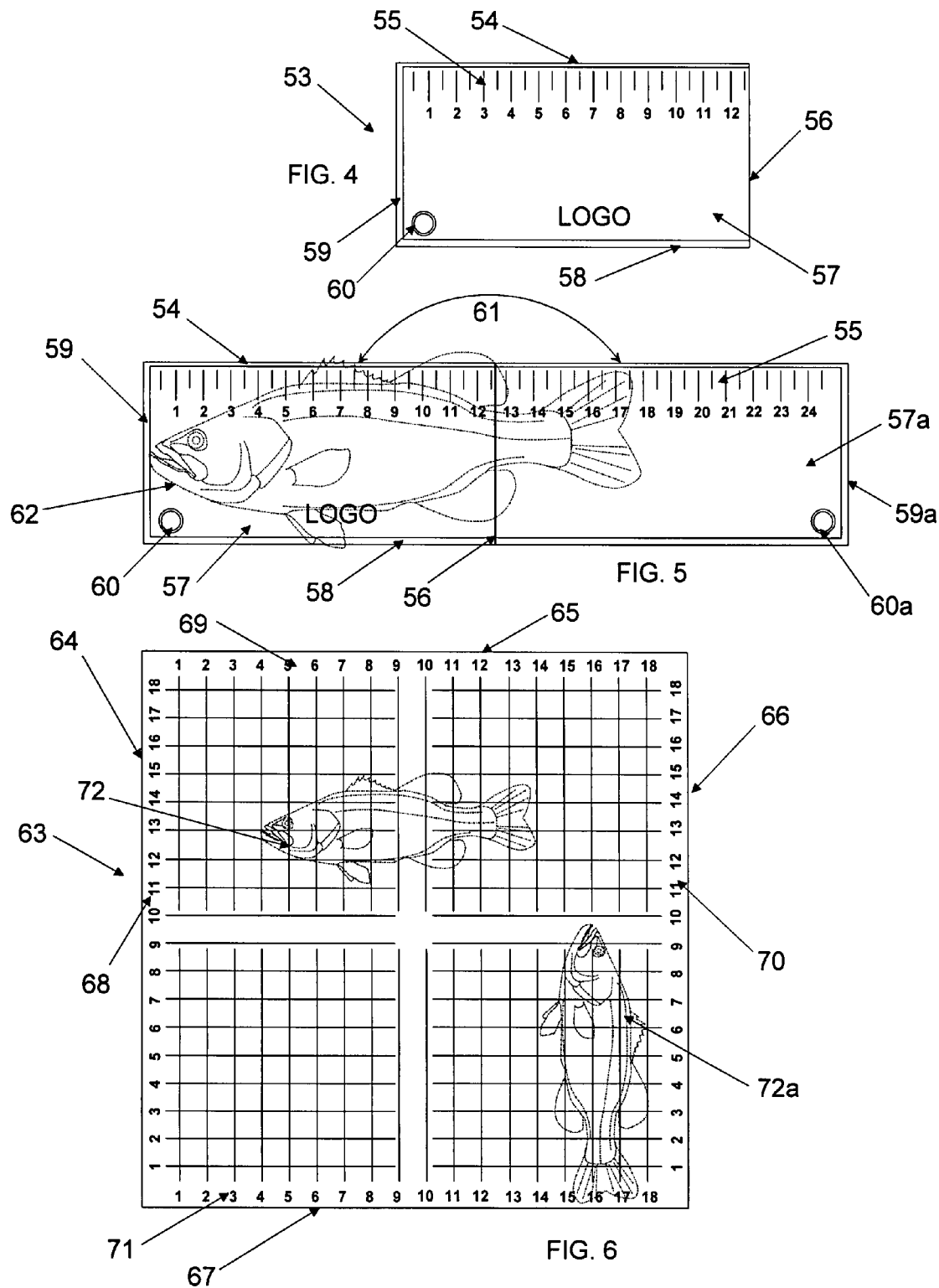

FLEXIBLE, SHEETLIKE FISH MEASURING DEVICE

FIELD OF THE INVENTION

The present invention relates to equipment and tackle used for recreational fishing. More specifically, the present invention relates to recreational fishing devices used to measure a freshly caught fish length.

BACKGROUND OF THE INVENTION

Sport and recreational fishing is a popular pastime, and, accordingly, the production of sport fishing equipment has become a very large industry. Critical to every recreational angler is the length and weight of each fish that constitutes their catch. In addition, catch-and-release fishing, for example, is one method which has grown in popularity, either by regulation in some areas, or by the voluntary action of fishermen. In the case of catch-and-release fishing, measurement of at least the length of each fish is an essential part of the fishing experience so that a sport fisherman can relate to others their prowess in catching large fish, albeit to let them go after admiring them. All states and territories of the United States maintain laws and regulations requiring minimum lengths of some fish caught in their jurisdictions. These laws and regulations are intended to reduce the potential for overfishing. However, many states provide for regulations for only specific regions or bodies of water where overfishing is a recognized problem. In addition, the regulations can be quite complex in requiring that fish be kept only if their length is within or outside of very specific ranges, i.e., slot limits allow for keeping fish only (1) above a minimum length, (2) below a lower length above the minimum and (3) above a higher length above the lower length. An example of a slot limit is a minimum length of 12 inches with a lower length of 18 inches and an upper length of 24 inches. A fish with a length of 19 inches could not be kept but a fish with a length of 25 inches could be kept. A length measurement device is clearly critical to the fishing process.

Minimizing handling for both catch-and-release fishing and fishing for keeps aids in maintaining the vitality of the fish. However, upon catching a fish, a fisherman must obtain a handhold on the fish, which is sometimes difficult because the fish is slippery, and is thrashing about, remove the hook from the fish, and place the fish adjacent to some measuring scale, such as a rigid ruler or flexible tape. Then, if the fish does not meet the length requirements or if all fish are released, the fisherman will return the fish back into the water.

All of these actions are difficult to perform, time consuming, and subject the fish to some level of trauma, sometimes needlessly. The time and trauma involved can sometimes lead to major injury, or even the needless death of the fish. While measuring devices abound for caught fish, they are often not usable in the place most advantageous to the health of the fish and to minimizing the thrashing reflex of the caught fish.

The prior art is extensive with respect to devices for catch site measurement of fish caught for recreation (or competition). U.S. Pat. Nos. 4,876,818, 4,631,851, 6,094,996, and 6,615,532 all describe incorporation of a measurement component into a typical hand held net for sport fishing. The disadvantages of such an incorporation are readily apparent. A freshly caught fish will be thrashing vigorously in the net and will need to be restrained and forced into a measuring position adjacent to the measuring component in the net. In addition, the fish typically responds to restraint by arching its body sideways, making measurement difficult or inaccurate.

The prior art also describes incorporation of measurement components in a fishing gaff or other rigid lengths, as in U.S. Pat. Nos. 5,228,226, 4,885,862, 5,934,004, D372,294 and 6,115,932. Various approaches to measuring fish are known in the prior art, but each of the known approaches suffers from certain problems and disadvantages. One common approach is to use a general measuring device, such as a yardstick or tape measure. In this approach the fisherman must simultaneously hold both the fish and the measuring device, properly position the fish relative to the measuring device, and read the length of the fish from the markings on the measuring device while holding the fish in the proper position. In addition to the mechanical difficulty of simultaneously holding, positioning, and measuring, this approach has the serious disadvantages of leading to inaccurate measurements and of exposing both fisherman and fish to injury. These acts are not optional given the penalties, fines and imprisonment that can occur through keeping fish of an illegal length.

Fishermen typically handle fish with their bare hands. It is more practical to perform all fishing tasks with bare hands in light of a high degree of manual dexterity required for other fishing operations, such as tending to reels, rods, lures, bait and fishing lines. Pulling on gloves or picking up a towel or cloth to protect the hands in the act of catching a fish is usually out of the question. It is well known that gloves and towels are used by fishermen in the acts of post-catch activities to protect hands or to wipe surfaces clean, but use of gloves or towels at or immediately after catching a fish is not preferred by them. However, gloves or towels are sometimes used in the act of handling freshly caught fish.

One drawback to use of gloves or towels in handling fish is the quick accumulation of slime and scales on any absorbent surface. Fish have substantial amounts of slime on their outer surfaces for a reason. It protects the fish from bacterial, and fungal infections. So fishermen reserve use of absorbent articles such as towels for wiping their own hands after handling fish to measure them. The thrashing reflex of fish out of water can be more effectively restrained with a dry towel un-infused with fish slime and scales, but the effectiveness of the towel for restraint over a user's hand is dramatically reduced when the towel is wetted and/or coated with fish slime and scales.

There is a need for a sport or recreational fishing device that can be easily used by a fisherman to assist in holding and measuring a freshly caught fish and is incorporated into equipment that a fisherman would typically carry for fishing.

SUMMARY OF THE INVENTION

The present invention is a towel or absorbent cloth adapted for use by a fisherman for grasping a freshly caught fish with measurement means visible on a surface of the towel or absorbent cloth. In a preferred embodiment, attaching means provide for attachment of the towel to a belt, pants top of a user or a nearby boat seat so that it can be easily reached upon catching a fish. In another embodiment, a grasping part of the towel or cloth is adapted to minimize absorbency to preserve the protective slime coat of a freshly caught fish so that it can be safely released after measurement.

Yet another embodiment comprises a towel or cloth with multiple folds which are releasably secured in a compact form, where measurement marks are continuous along the fully unfolded length of the towel. In a compact form, the towel is used for measuring smaller fish, where in a fully unfolded state the towel is used for measuring longer fish.

It is preferred that measurement marks for inches or centimeters (and their subdivisions) be located on a long edge of the invention towel. In this form, the invention towel can be used as a flexible tape measure and be held edgewise along a length of a fish so that only said long edge need be brought close to the fish to measure its length. In using it this way, the measuring part of the towel need not touch a fish at all.

In another usage, the invention towel may be spread out on any relatively flat surface with its measurement markings visible to a user looking down at the invention towel. The user can then place the length of a gutted fish along the measurement markings for cutting desired lengths of the fish body for storage or distribution among other fishermen when a catch is shared. A particularly useful measurement accomplished with the invention towel is during a fillet step in relation to a regulation of the State of California, i.e., a piece of the fish's skin measuring at least two inches by two inches must be retained on each fillet for identification of the species. A towel is commonly used near the cleaning and filleting operation. The invention towel is quickly spread so that length measurements of the skin piece are determined.

Printing and embroidering of towel and absorbent cloth material is well known. In one embodiment of the invention towel, a representation of a ruler is printed on the edge of the towel or within a mid portion of the towel. Alternately, grid lines are printed on a towel's surface uniformly spaced apart with unit measurements easily read along the grid lines so a fish may be supported generally anywhere or in aligned in almost any direction relative to the printed towel surface and a fish's length and width measurements may be viewed by a user. Grid lines can run parallel and diagonal to edges of a rectangular towel in such an embodiment. Indications of length units on the invention towel may be incorporated with the absorbent material in other ways, i.e., by way of screen printing, painting, heat transfer or the like.

The user of an invention towel will have initially reeled in a subject fish. A user may wet the towel and reach into the water to retrieve the fish, supporting the fish in a wetted surface less likely to remove protective slime and scales but providing a secure grasp of the fish with a single hand. A user may support the fish in the towel with palm(s) upward so that a printed ruler on the towel is oriented with the length of the fish to note its measured length. Alternately, a user may drape the towel over the top of a fish and hold the fish in their bare hands, where the printed ruler is viewed on the top surface and the fish's length can be determined by the support length of the towel over the length of the fish.

Therefore, an object of the present invention is to provide a measuring means integral with absorbent material for measuring a fish's length without killing or damaging the fish.

BRIEF DESCRIPTION OF THE DRAWINGS

FIG. 1 is a front, perspective view of a prior art towel for use in sport fishing having a belt loop.

FIG. 2 is a top view of an invention towel for use in sport fishing having fish measurement means imprinted on its top surface along an outside edge and along a mid-line portion of a towel length, where a second layer is integrally attached to long edges of the towel to form a glove or mitt for a user's hand.

FIG. 3 is a top view of an invention towel for use in sport fishing having fish measurement means imprinted on its top surface along a diagonal of a rectangular shape of the towel.

FIG. 4 is a top view of an invention towel for use in sport fishing presenting fish measurement means imprinted on its top surface along an outside edge, where the towel is folded and showing only half its full length.

FIG. 5 is the towel of FIG. 4 unfolded to full length.

FIG. 6 is a top view of an invention towel for use in sport fishing having fish measurement means imprinted on its top surface shown as a grid allowing a user to measure a fish in either of two directions.

DETAILED DESCRIPTION OF THE INVENTION

Figure 7:
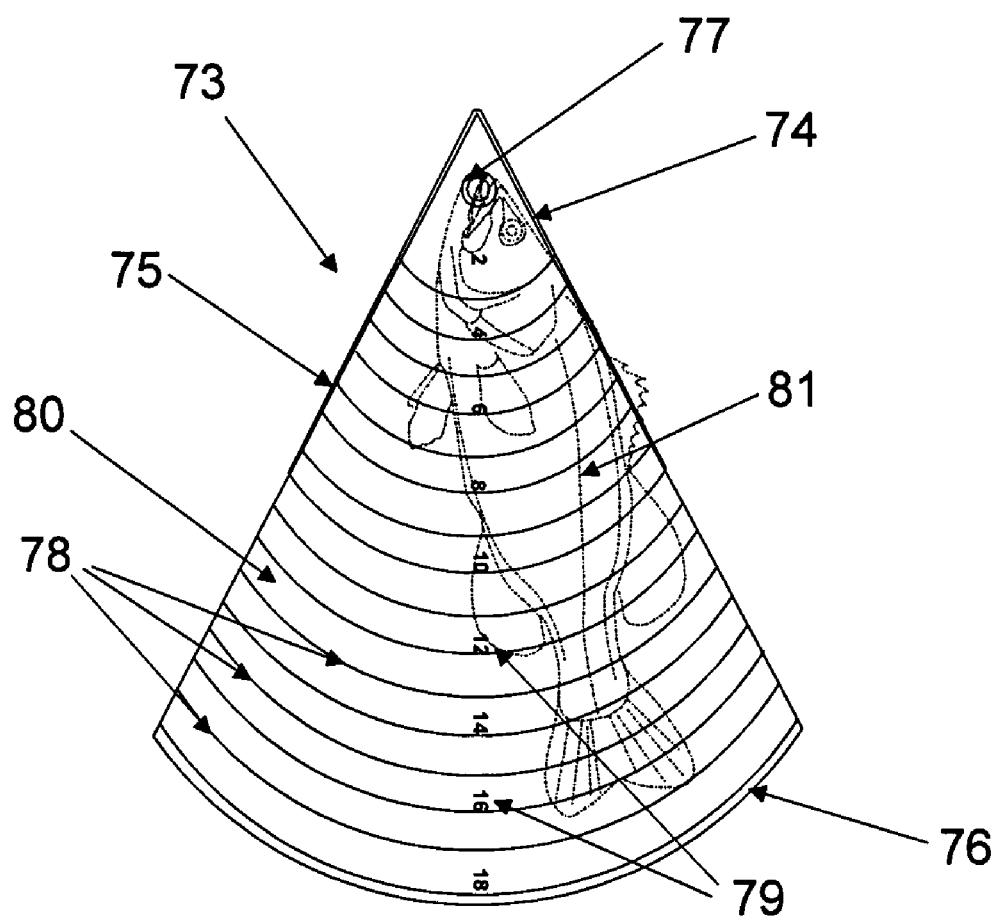
FIG. 7 is a top view of a triangle-shaped invention towel for use in sport fishing having fish measurement means imprinted on its top surface along an outside edge as arcs sections of circles whose centers are at a belt loop opening at an apex of the towel.

The invention is now discussed with reference to the figures. FIG. 1 is a prior art towel 10 for use in sport fishing. It is common for a text or graphic device to be printed or embroidered to visible on a surface of the towel 10. Towel 10 is shown in a folded state comprising a single sheet of towel material such as terrycloth, woven or non-woven flexible and absorbent sheet material or its equivalent and is adapted to dry a user's hands or other surface. Halves 11 and 12 of towel 10 join at fold 13, sharing bottom edge 16 and top edge 17, where hook strap 19 and loop patch 20 form hook and loop means for maintaining halves 11 and 12 in a folded position and to further provide a loop 15 in strap 19 so that towel 10 can be attached to a user's belt or on a wall hook. Towel can further be folded again at fold 14. Edges 18 of halves 11 and 12 are generally aligned in the folded position.

FIG. 2 is a top view of a rectangular invention towel 30 with long edges 34 and 35 and end edges 32 and 33 generally defining top surface 31. The embodiments of the invention fishing towels generally comprise a single sheet of towel material such as terrycloth, woven or non-woven flexible and absorbent sheet material or its equivalent, unless otherwise described.

Top surface 31 of towel 30 comprises imprinted or embroidered measurement means 39 comprising rule marks for units 1 through 12, which may represent inches, centimeters or other useful measurement units. Fish 21 comprises a end to end axis 22 which is aligned with edge 35 so that fish 21 can be measured for length.

In another embodiment as to the placement of measurement means on towel 30, measurement means 40 is imprinted generally along a mid-line between edges 34 and 35 so that fish 41 (shown in broken lines) can be measured with substantial towel material extends beyond a width of fish 41. It is preferred that a user may place their hand palm upward underneath towel 30 in the area of the head of fish 41 and allow their arm to extend rearward along the end to end axis of fish 41 so that the user's hand grasps, through the towel material of towel 30, the head of fish 41 for restraint, allowing a user's other hand free to draw edge 33 rearward of a thrashing fish and then to further restrain the fish's tail for measurement using measurement means 40.

A mitt embodiment of the invention towel is shown in FIG. 2 where a sheet 37 of flexible material generally the size of towel 30 is sewn or secured to edges 34 and 35 with opening 38 adapted to receive a user's hand for insertion between towel 30 and sheet 37 in the manner of a mitt. The mitt embodiment allows a user greater freedom to align the measurement means of towel 30 along an end to end axis of a fish for measurement without fear of having towel 30 drop from a user's hand in the measurement process. In a fresh caught embodiment, a user may wear the mitt of towel 30 and sheet 37 during the process of reeling in a fish. After a fish is lifted from the water by a user's free hand by way of a fishing line, the user can quickly and effectively restrain the freshly caught fish with a mitt covered hand and, with or without removal of a hook set in the fish's mouth, measure the fish with measurement means on towel 30. If the measurement process takes place before de-hooking, a user can know whether the freshly caught fish needs to be released as undersized. The user can take greater care to unhook an undersized fish which is to be released than one which is to be kept.

In yet another embodiment of the mitt invention towel 30 and sheet 37, a user may insert rod 52 in direction 51 so that it forms a rigid support for edge 35, thereby assuring an even greater degree of measurement accuracy. Rod 52 can be easily removed after measurement has taken place by way of measurement means 39.

The invention towel may comprise means for attaching it to a user's belt or other convenient support, which is partly shown in FIGS. 2 and 3 as reinforced hole 36. Hole 36 is adapted to receive thongs, clips, hooks, hook and loop straps or equivalent means from which a user may connect towel 30 to a user's belt or other convenient support.

FIG. 3 shows towel 42 as an alternate form of towel 30 in FIG. 2. Towel 42 of FIG. 3 shows long edges 44 and end edges 43 defining a rectangular top surface 50, upon which are imprinted or embroidered (or their equivalent) measurement means 45 along a diagonal of surface 50. In addition, outlines of fish 47 and 49 intending to be caught, i.e., Red Fish or Blue Fish for example, may be shown in alignment with means 45 in conjunction with indications 46 and 48 of minimum legal length for such a fish. A notation of the jurisdiction setting those limits may be noted on surface 50.

The invention towel may be secured in a folded state for convenient support on a user's belt and unfolded to a longer state to measure a fish having a length greater than the folded state length. FIG. 4 shows towel 53 folded in half at fold 56, with half sheet 57 bearing a first half of measurement means 55 along edge 54, opposite edge 58. End edge 53 is the location of hole 60. FIG. 5 shows towel 53 opened, showing halves 57 and 57a bearing the full extent of means 55 for measuring long fish. Hole 60a is adapted to align with hole 60 when folded so that halves 57 and 57a are maintained together when a loop of cord or clip are inserted through holes 60 and 60a. Similarly, edge 59a is also adapted to align beneath edge 59 in the folded state.

FIG. 6 is a grid bearing embodiment of the invention towel 63, where edges 67, 68, 69 and 70 generally bear, respectively, measurement means 71, 68, 69 and 70, which in turn indicate measurement of a fish 72 or 72a lying on top surface. In the grid embodiment, multiple fish may be measured simultaneously.

FIG. 7 shows a wedge embodiment of the invention towel 73, where angle edges 74 and 75 form an acute angle and extend down to circular arc edge 76. Edge 76 is a section of a circle whose center is hole 77. Arc measurement lines 78 are made on top surface 80 also sections of a circle whose center is hole 77 and which indicate unit fish lengths 79. The wedge embodiment minimizes sheet size of a towel accomplishing the objects of the invention while requiring only an alignment of one end of a fish with hole 77, thereby making it possible to determine a fish length without alignment of a caught fish 81 (in broken lines) to a single linear measurement means. The radial measurement means shown in FIG. 7 may be applied to invention towels of other peripheral shapes.

The invention measuring towel has a first length of greater than a fish that a user desires to catch and a width of at least two inches or more so that a user has sufficient towel material to use the invention towel for a function other than simple fish measurement, i.e., for a specific example, a desired volume of liquid for drying hands or mopping a surface could be absorbed in a terrycloth towel of at least about two inches wide and about six inches long.

The invention towel is capable of bearing printed indications of slot limits of (1) a minimum length of, say, of 6 inches, (2) a lower length of, say, 9 inches and (3) a higher length of, say, 12 inches. The invention towels can inexpensively be printed or formed bearing an indication of at localities where confusing or lesser known slot limits apply and optionally distributed there for promotional items.

The above description discloses to one skilled in the art sufficient instruction that such a person may select, within skill in the art, appropriate and/or well-known modifications of apparatus, structures, and methods of using the above examples and descriptions of the invention without departing from its objects.

I claim:

1. A towel for measurement of a freshly caught fish comprising:
   (a) a towel formed of a sheet of flexible and absorbent material comprising a first length equal to or greater than a fish which a user intends to catch during a sport fishing effort and a first width of about two inches or more;
   (b) a measurement means formed along the first length visible to a user on a top surface of the towel wherein measurement units are indicated by spaced apart text or graphic devices so that a length of a fish can be determined by a user aligning the fish along the measurement means and viewing results of said alignment; and
   (c) the towel further comprises two long edges effectively aligned to the first length, where to said long edges are joined opposite edges of a mitt sheet of flexible material such that a cavity with a hand opening are defined by inside surfaces of the towel and mitt sheet so that a user can insert a hand into said cavity with the palm upward to a bottom surface of the towel and having the user's fingers aligned with the measurement means on the top surface of the towel.

2. The towel of claim 1 wherein a rod is removably insertable into said cavity and aligned with the measurement units on said top surface but separated a layer of the towel to support a portion of the towel bearing the measurement units.

3. The towel of claim 1 wherein additional text on said top surface is indicative of regulations relating to minimum fish length in a user's locale.

4. The towel of claim 1 wherein additional text or graphic devices on said top surface are indicative of a trademark of a commercial business entity.

5. The towel of claim 1 wherein the measurement means are incorporated into a grid indicated on the top surface so that a fish can be measured along the first length or along a direction normal to the first length.

6. The towel of claim 1 wherein the measurement means indicate one or more lengths of one or more minimum fish lengths which are required by regulation in a user's locale.

7. The towel of claim 1 wherein the joined opposite edges are releasably joined but are joined for use of the towel for measurement of fish.

\* \* \* \* \*